United States Patent [19]
Dent

[11] Patent Number: 5,361,404
[45] Date of Patent: Nov. 1, 1994

[54] DIVERSITY RECEIVING SYSTEM

[75] Inventor: Paul W. Dent, Stehag, Sweden

[73] Assignee: Ericsson-GE Mobile Communications Inc., Research Triangle Park, N.C.

[21] Appl. No.: 61,038

[22] Filed: May 14, 1993

Related U.S. Application Data

[63] Continuation of Ser. No. 585,910, Sep. 2, 1990, abandoned.

[51] Int. Cl.$^5$ .......................................... H04B 17/02
[52] U.S. Cl. .................................... 455/135; 455/136; 455/138; 455/140; 455/275; 455/277.2; 455/278.1; 370/95.3
[58] Field of Search ............................... 455/134–141, 455/273, 275, 276.1, 277.1, 277.2, 278.1; 370/95.1, 95.3

[56] References Cited

U.S. PATENT DOCUMENTS

| | | | |
|---|---|---|---|
| 3,302,115 | 1/1967 | Shiki | 455/135 |
| 3,728,633 | 4/1973 | Krebs | 455/138 |
| 3,859,601 | 1/1975 | Curtis | 455/138 |
| 3,879,664 | 4/1975 | Monsen | 375/14 |
| 3,934,204 | 1/1976 | Hill | 455/136 |
| 3,965,422 | 6/1976 | Tagliaferri | 455/138 |
| 4,347,627 | 8/1982 | Alter | 455/136 |
| 4,450,585 | 5/1984 | Bell | 455/135 |
| 4,530,087 | 7/1985 | Yamamoto | 370/104.1 |
| 4,710,945 | 12/1987 | Bocci et al. | 375/100 |
| 4,742,563 | 5/1988 | Fukumura | 455/132 |
| 4,868,890 | 9/1989 | Lennartsson | 455/139 |
| 4,926,498 | 5/1990 | Suzuki | 455/135 |

FOREIGN PATENT DOCUMENTS

| | | |
|---|---|---|
| 0095165A2 | 11/1983 | European Pat. Off. . |
| 0318665A2 | 6/1989 | European Pat. Off. . |
| 0333042 | 9/1989 | European Pat. Off. . |
| 219585 | 3/1989 | New Zealand . |

OTHER PUBLICATIONS

Patent Abstract of Japan, Publication No. 61-131625 (A), vol. 10, No. 325, published Jun. 19, 1986.
Patent Abstracts of Japan, Publication No. 57-92931 (A), vol. 6, No. 176, published Jun. 9, 1982.
Patent Abstracts of Japan, Publication No. 59-92633 (A), vol. 8, No. 206, published May 28, 1984.
Australian Patent Abstract Document No. AU-A-31 461/89, published Sep. 21, 1989 in connection with Australian Application No. 31461/89.

*Primary Examiner*—Reinhard J. Eisenzopf
*Assistant Examiner*—Andrew Faile
*Attorney, Agent, or Firm*—Burns, Doane, Swecker & Mathis

[57] ABSTRACT

Two or more signal paths are provided for receiving a radio frequency signal. One or more signal paths include conventional bandpass filters for eliminating interference and noise signals. One or more remaining signal paths include reduced filtering devices for increasing the sensitivity of a radio frequency receiver to the desired signal. Each of the receiving paths is coupled to a respective radio frequency amplifier. Provided that each radio frequency amplifier has equivalent current-source output impedances, the output signals from each amplifier are added constructively if they are in-phase. If the output signals are out-of-phase, a phase inverter inverts the phase of one signal so that the signals may be added constructively. The combined signals of the two or more radio frequency amplifiers pass through various signal processing components associated with conventional superheterodyne receivers. A control unit produces gain variation signals for controlling the gain of each radio frequency amplifier. Accordingly, the control unit controls whether the desired signal is received from a first signal path, a second signal path, or as a weighted combination of two or more signal paths.

25 Claims, 4 Drawing Sheets

DIVERSITY RECEIVING SYSTEM

This application is a continuation of application Ser. No. 07/585,910, filed Sep. 21, 1990 abandoned.

FIELD OF THE INVENTION

The present invention relates generally to radio frequency signal receivers, and more particularly, to radio receivers having two or more alternative receiving paths which are selected or combined according to the respective signal qualities of signals received on each path.

BACKGROUND OF THE INVENTION

In many system applications, for example in the cellular mobile radio telephone communications field, it is desirable to provide a radio receiver having more than one receiving path for receiving a radio signal. For example, when a radio frequency signal is transmitted on more than one frequency or when two or more receiving antennas are used, the output signals received by a receiver on the plural receiving paths may be combined in order to optimally detect the desired information in the received signal. Oftentimes, the signal quality and signal strength among each of the received signals vary to some degree. By either combining the plural channel signals or selecting the channel having the optimal received signal, higher quality reception is achieved.

There are two techniques for handling signals received on plural channels. The first technique is selection diversity, and as its name suggests, a single, best signal processing channel is selected from a plurality of received signals. In the second technique, diversity combining, different signals received over the plural channels are processed in parallel and combined in some optimum way. Diversity combining is further divided into two categories according to whether the processed signals are combined before demodulation or after demodulation. If the signals are combined before demodulation, a control device is required to insure that the processed signals are combined in phase. In contrast, if the signals are combined after demodulation, the combination is generally insensitive to phase differences. Thus, predetect combination diversity refers to signal combination before demodulation, and postdetect combination diversity refers to signal combination after demodulation.

In a conventional, superheterodyne receiver, as illustrated in FIG. 1, a received signal first passes through a bandpass filter 10 before it is amplified in a RF amplifier 12. The bandpass filter 10 filters out-of-band signals that may saturate the RF amplifier 12. In other words, the filter 10 insures that only the desired signal components are amplified. After amplification, the output signal produced by the amplifier 12 passes through a second bandpass filter 14. The bandpass filter 14 filters out any remaining out-of-band signals that were not completely suppressed by the bandpass filter 10. In addition, the bandpass filter 14 reduces noise and interference at other frequencies to which the mixer may exhibit undesired responses. The output signal from the second bandpass filter 14 is received by a frequency mixer 16. By mixing a signal from a local oscillator 18 with the filter output signal, the mixer 16 converts the received frequency into an intermediate frequency suitable for further conventional receiver processing, such as demodulation, as indicated by the demodulator 20.

Unfortunately, the two bandpass filters 10 and 14 cause some loss of desired signal energy. Consequently, there is a compromise in radio receiver design between sensitivity to the desired signal components and insensitivity to interfering signal components on other frequencies as well as to background noise. In situations where interference and/or noise signal components are absent or at a negligible level, it would be advantageous to eliminate the decrease in sensitivity to the desired signal caused by the bandpass filters 10 and 14. Accordingly, a primary object of the present invention is to increase the sensitivity of the radio receiving apparatus when interference and/or noise signals are either absent or at a negligible level by bypassing a receiving path having one or more of the bandpass filters 10 and 14 and receiving signals on another path having fewer or no filters.

SUMMARY OF THE INVENTION

A radio receiver includes two or more signal paths which each receive a radio frequency signal. One or more signal paths include conventional bandpass filters for eliminating interference and noise signals. One or more remaining signal paths include reduced filtering devices for increasing the sensitivity of a radio frequency receiver to the desired signal. Each of the receiving paths is coupled to a respective radio frequency amplifier. Provided that each radio frequency amplifier has equivalent current-source output impedances, the output signals from each amplifier are added constructively if they are in-phase. If the output signals are out-of-phase, a phase inverter inverts the phase of one signal so that the signals may be added constructively. The combined signals of two or more radio frequency amplifiers pass through various signal processing components associated with conventional superheterodyne receivers. A control unit produces gain variation signals for controlling the gain of each radio frequency amplifier. Accordingly, the control unit determines whether the desired signal is received from a first signal path, a second signal path, or with a weighted combination of several signal paths.

BRIEF DESCRIPTION OF THE DRAWINGS

These and other features and advantages of the invention will be readily apparent to one of ordinary skill in the art from the following written description, read in conjunction with the drawings, in which.

DETAILED DESCRIPTION OF THE PREFERRED EMBODIMENTS

Figure 1:
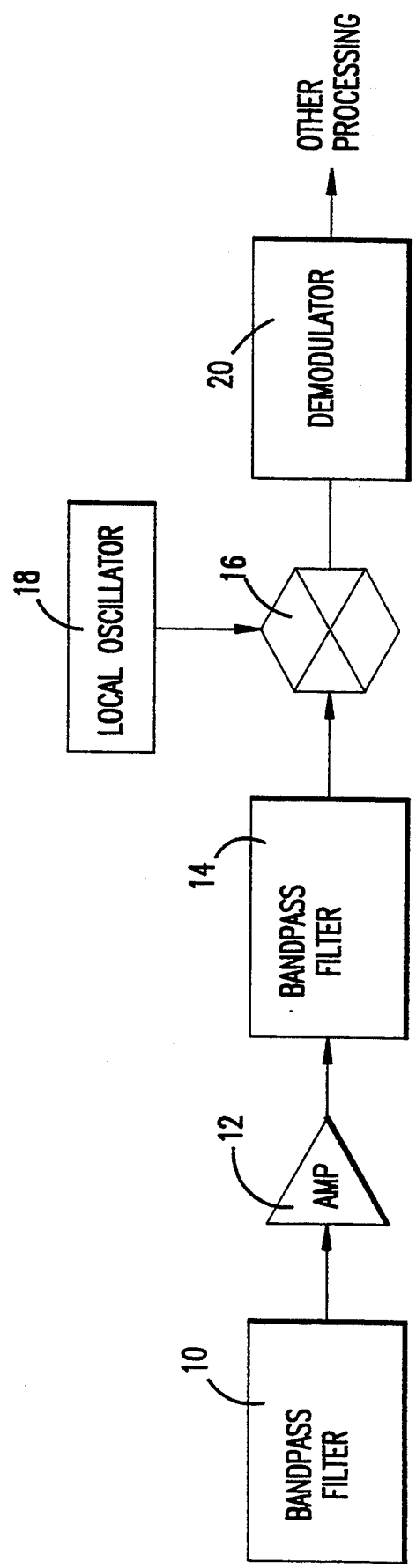
FIG. 1 is a schematic block diagram of a conventional superheterodyne radio receiver.
Figure 2:
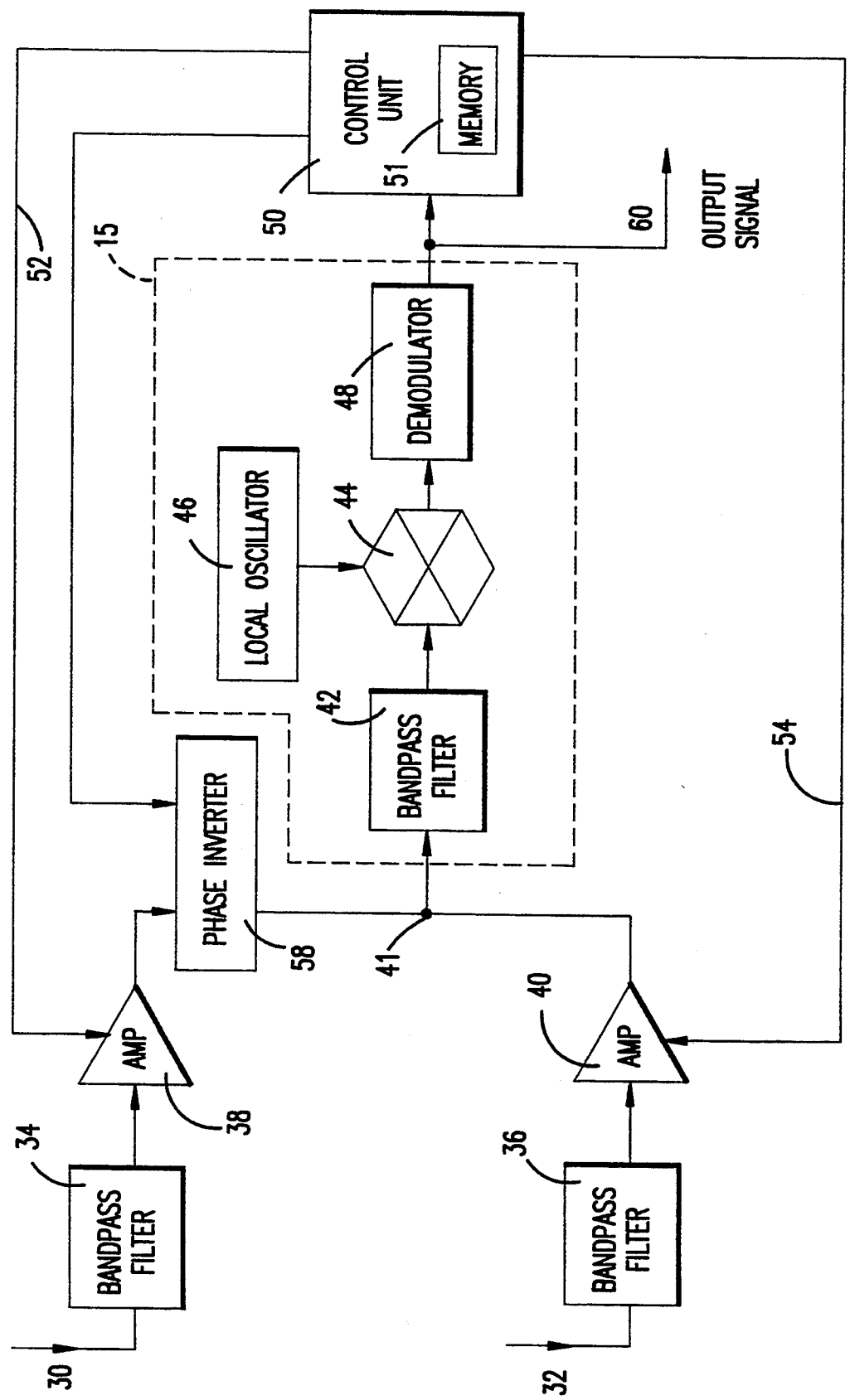
FIG. 2 is a schematic block diagram of a system for implementing the present invention.

FIG. 2 shows a schematic block diagram of a system for implementing the present invention. It will be appreciated that while one of the specific applications of the present invention is to cellular mobile radio telephone receivers, the present invention may be used in any signal receiving apparatus.

Two separate receiving paths 30 and 32 receive a radio frequency (RF) signal generated by an antenna (not shown). While only two signal receiving paths are shown, the present invention may be applied to any number of signal receiving paths. In addition, each received RF signal may come from a respective, independent antenna. The term signal path may include, for example, a communications channel in a cellular mobile radio telephone system. The received signal on the first signal path 30 is filtered by a bandpass filter 34, and the filtered signal is applied to an RF amplifier 38. Similarly, the signal received on the second signal path 32 is filtered by a bandpass filter 36 which can be designed to have a lower signal loss to the wanted signal than the bandpass filter 34. The filter 36, for example, may be a simpler, lower-cost device having fewer poles than filter 34. Additionally, whereas the "main" receiving path containing filter 34 may be connected to the same antenna as a high-power transmitter in duplex fashion, the filter 36 may be manufactured using a compact low-cost technology without having to worry about isolation from the radio transmitter. The signals from the second signal path 32 are applied to an RF amplifier 40.

The amplified signals from each signal path 30 and 32 are summed in a summing junction 41. By using conventional impedance matching techniques, the amplifier 38 and the amplifier 40 can be made to have matched high output impedances so that both amplifier output signals can be added together. In this particular situation, the amplifier output signals are added constructively in parallel if the output signals are in-phase. In situations where the amplified output signals are out-of-phase, destructive signal addition occurs. In an alternative embodiment, a hybrid coupler may be used as the summing junction without requiring any matching.

After combining the output signals of the amplifiers 38 and 40 at the summing junction 41, the combined signal is processed by conventional, signal processing elements found in a superheterodyne receiver 15. These elements may include, but are not limited to, a premixer bandpass filter 42, a frequency mixer 44 which converts the received signal to a convenient intermediate radio frequency, and a demodulator 48 for demodulating the information signal from the carrier. The output signal 60 from the superheterodyne receiver may be processed further depending upon the application.

A control unit 50, including a memory 51, samples the output signal from the superheterodyne receiver 48. In a preferred embodiment of the present invention, the control unit 50 is a conventional microprocessor. For the simplest situation, the control unit 50 determines whether a better signal quality may be achieved using only the amplified signal from the amplifier 38 or the amplified signal from the amplifier 40. In more complicated situations, the control unit 50 determines to what extent the amplified output from both of the amplifiers 38 and 40 should influence the combined output from combining means 41 in order to obtain optimal signal quality.

The control unit 50 tests for optimal signal quality using a number of criteria. While any number and/or type of criteria may be used, the simplest quantity for the control unit 50 to test quickly is the signal strength. Another criteria could be bit error rate. During a testing condition, a number of samples of the signal strength of the output signal from the superheterodyne receiver are processed to determine the extent, if any, that each amplified signal has on the combined output signal. For example, the control unit 50 tests the quality of the receiver output signal 60 with only the signal path 30 enabled. In this case, the gain control signal 54 to the amplifier 40 is zero while the gain control signal 52 to the amplifier 38 is some non-zero value. Subsequently, the first amplifier 38 is deactivated by reducing the gain control signal 52 to zero while increasing the gain control signal 54 to the amplifier 40 to some non-zero value. Different combinations of variable gains or weights may be applied to both of the amplifiers 38 and 40 over their respective control lines 52 and 54. The signal strength values resulting from each of these test conditions is stored in the memory 51 by the control device 50.

An additional test may be run with a phase inverter 58 inserted in one signal path to reverse, for example, the phase of the output signal of the amplifier 38. If destructive signal addition occurs when both signal paths 30 and 32 are enabled, the control unit 50 can activate the phase inverter 58 to invert the phase in one signal path to achieve constructive signal addition. In addition, a phase inverter 58 may be included in more than one signal path so that plural and alternative phase shifts may be selected by the control unit 50. Similarly, instead of phase inverters, variable phase shifters may be used to more accurately compensate for phase differences in the different signal paths.

Usually, the signal path having the strongest measured signal strength will be selected. It may happen, however, that the strongest signal nevertheless gives poor demodulated signal quality or a high bit error rate. In such an instance, a warning flag associated with that signal path is set indicating poor quality of the resulting data. The weaker of the two signal paths will then be selected. If the weaker signal becomes so weak as to significantly impair reception, the stronger signal path may again be checked. If the data resulting from the stronger signal has improved, it will again be selected, and its associated warning flag will be reset.

Figure 3A:
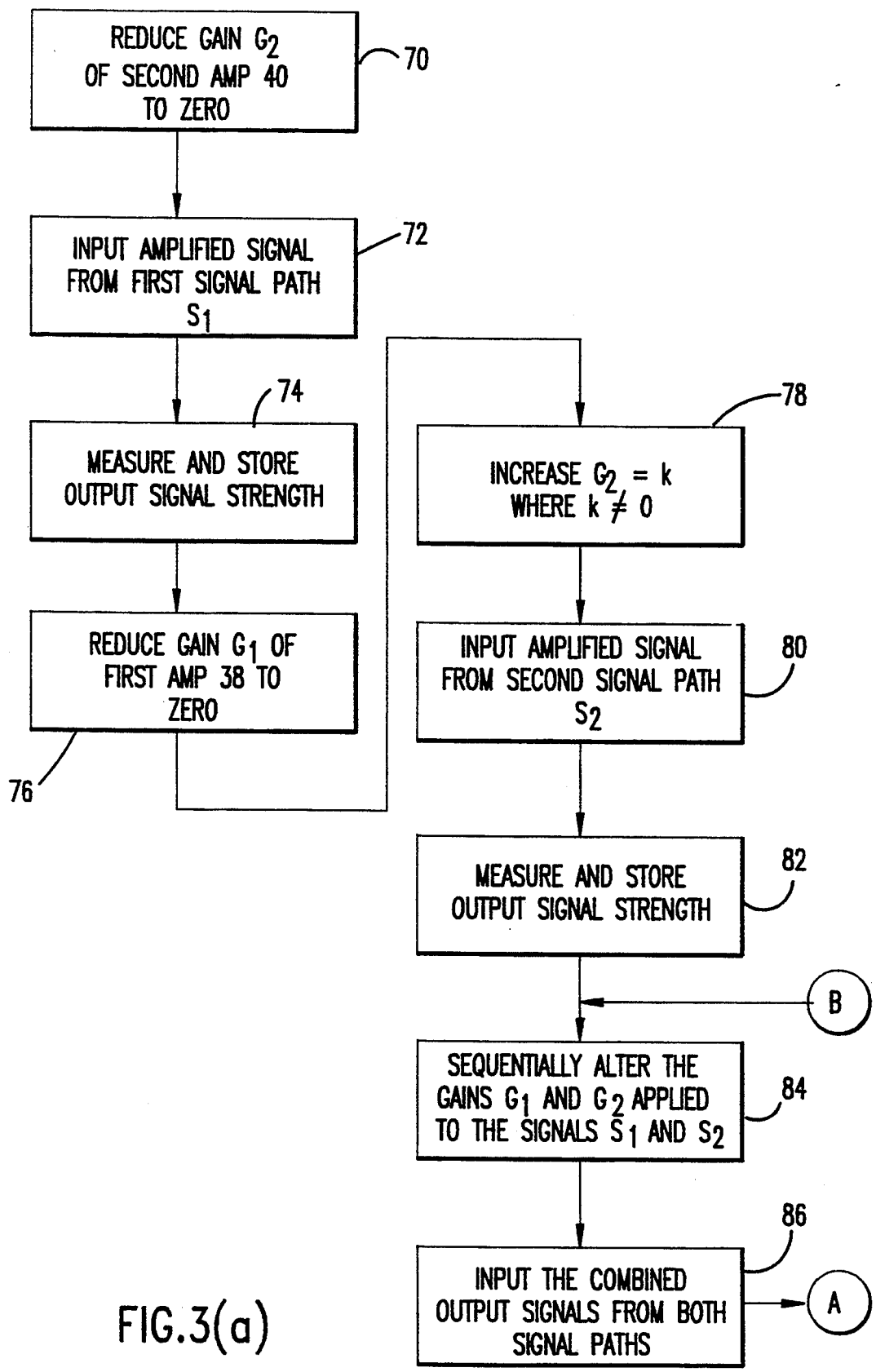
FIGS. 3(a)–3(b) are flow diagrams depicting the program control for implementing the present invention.
Figure 3B:
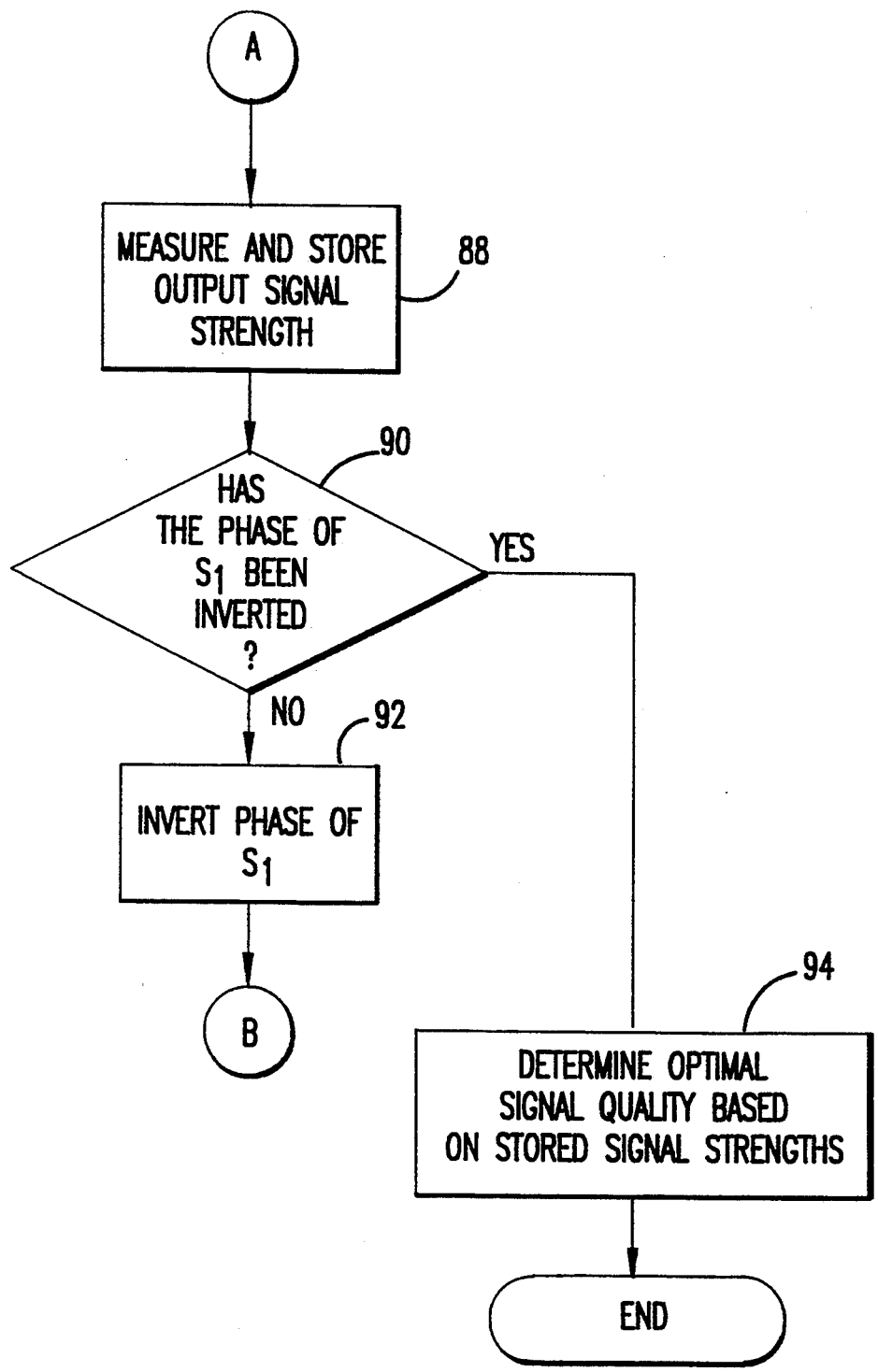

An example of the program flow that may be followed by the control unit 50 in implementing the optimal signal quality testing is depicted in FIGS. 3(a) and 3(b). In function block 70, the gain $G_2$ of the second amplifier 40 is reduced to zero, so that only the amplifier path 30 is enabled. In this case, the gain control signal 54 from the control unit 50 to the amplifier 40 is zero, while the gain control signal 52 to the amplifier 38 is some non-zero value. Program control passes to the function block 72, where the amplified signal from the first signal path 30 is received by the bandpass filter 42. In the function block 74, the resulting strength of the receiver output signal 60 is measured and stored in the memory 51. Subsequently, in the function block 76, the first amplifier 38 is deactivated by reducing the gain $G_1$ via the gain control signal 52 to zero. In the function block 78, the gain $G_2$ of the amplifier 40 is increased via the gain control signal 54 to some non-zero value k. In the function block 80, the amplified signal from the second signal path 32 is received by the bandpass filter 42. Program flow proceeds to the function block 82, where the strength of the receiver output signal 60 is measured and stored in the memory 51.

Different combinations of the variable gains $G_1$ and $G_2$ applied to the amplifiers 38 and 40, respectively, may be achieved over the adaptive gain control lines 52 and 54. In the function block 84, the adaptive gain values represented by gains $G_1$ and $G_2$ are applied to the signals $S_1$ and $S_2$, respectively, giving a combined signal according to the equation: $G_1 S_1 + G_2 S_2$. By sequentially altering the gains $G_1$ and $G_2$, differently weighted combinations of the two signals are produced at the summing junction from which the combined signal is received by the bandpass filter 42, as indicated in the function block 86. Flow proceeds to the function block 88, where the strength of the receiver output signal 60 for each sequential variation of the weighted combination is measured and stored in the memory 51. At the decision block 90, if the phase of the signal $S_1$ on the first signal path has not been inverted, program flow proceeds to the function block 92 where the phase of the first signal $S_1$ is inverted. Subsequently, flow proceeds back to the function block 84. Alternatively, if the phase of the first signal $S_1$ from the first signal path 30 has been inverted, program flow proceeds to the function block 94 where the conditions under which the optimal receiver output signal quality was achieved is determined based on the various signal strengths stored in the memory 51 for each test condition.

After the control unit 50 sequentially tests each of the various test conditions, the control unit 50 determines which of the conditions resulted in the optimal signal quality of the output signal 60. As described above, the measure of signal quality tested by the control unit 50 under each of the test conditions is based upon which corresponding receiver output signal 60 resulted in a number of samples of the highest signal strength. Various well-known statistical analyses may be applied in order to determine which output signals have the highest quality. For example, a table may be stored of demodulated signal quality (i.e., bit errors in a given databurst) versus the measured signal strength for each of the signal paths alone and for the sum (phase inverter disabled) and difference (phase inverter enabled) of the signal paths. The table may include mean value, maximum and minimum values, standard deviation, or other information necessary to evaluate the probability that use of a particular signal path at the given signal strength will produce a certain databurst quality based on recent history. Using the tables, newly measured signal strengths may be translated into an expected number of bit errors with the signal path for which the fewest bit errors is expected then being selected. If actual use of that signal path results in a higher than expected number of bit errors, the statistical tables are then updated to give more correct estimates of the expected number of errors, possibly resulting in the previously selected signal path now being de-selected.

In the preferred embodiment, the radio signal is received in a time multiplexed format. In other words, part of the content of the received radio signal data is information destined for other radio receivers, e.g., other mobile telephones. One advantage of the present invention is that the control unit 50 determines the receiver output signal quality under the various test conditions described above during those time periods in the multiplexed data stream allocated to the information directed to other radio receivers. In time division multiple access (TDMA) communications, each radio frequency is divided into a series of frames, each frame including a particular number of time slots, e.g., three or six sots. One communications path or channel is assigned to a particular time slot. Thus, the control unit 50 receives and stores the transmitted information during the appropriate time slot assigned to the receiver. During the remaining time slots in the frame, the control unit 50 performs the necessary test conditions. Consequently, processing the various test conditions, such as varying the gains of the amplifiers 30 and 40, during these time slots or periods will not corrupt the desired signal of the data stream being received.

The invention has been described in terms of specific embodiments to facilitate understanding. The above embodiments, however, are illustrative rather than limitative. It will be readily apparent to one of ordinary skill in the art that departures may be made from the specific embodiments shown above without departing from the essential spirit and scope of the invention. Therefore, the invention should not be regarded as being limited to the above examples, but should be regarded instead as being fully commensurate in scope with the following claims.

What is claimed is:

1. A radio receiver for receiving a radio frequency signal and generating a desired output signal, comprising:

plural signal paths for receiving said radio frequency signal;

combining means, connected to said Signal paths, for combining a plurality of signals from said signal paths to form a combined signal; and control means, connected to said signal paths and combining means, for alternatively selecting the combined signal or a signal from one of said plurality of signal paths, wherein each signal path includes:

filtering means for filtering said received signal; and amplifier means for amplifying said filtered signal and generating an amplified signal;

and wherein the combining means is connected to each of said amplifier means and combines a plurality of said amplified signals to form the combined signal, and the control means is connected to each of said amplifier means and to the combining means and alternatively selects the combined signal or one of the plurality of said amplified signals to increase sensitivity to desired information in said radio frequency signal.

2. The system as described in claim 1, wherein said control means selects a single signal path from the plural signal paths, the single signal path resulting in said output signal having an optimal signal quality.

3. A radio receiver for receiving a radio frequency signal and generating a desired output signal, comprising:

plural signal paths for receiving said radio frequency signal, and control means for alternatively selecting one or combining a plurality of signals from their corresponding signal paths, wherein each signal path includes:

filtering means for filtering said received signal; and amplifier means for amplifying said filtered signal and generating an amplified signal; and wherein the control means is connected to each of said amplifier means, and alternatively selects one or combines a plurality of said amplified signals from their corresponding signal paths to increase sensitivity to desired information in said radio frequency signal, and selectively adapts a gain of at least one of said amplifier means and measures a signal quality of said output signal.

4. The radio receiver of claim 3, wherein said measured signal quality is a signal strength of said output signal.

5. The radio receiver of claim 3, wherein said measured signal quality is a bit error rate of said output signal.

6. A radio receiver for receiving a radio frequency signal and generating a desired output signal, comprising:
   plural signal paths for receiving said radio frequency signal, and
   control means for alternatively selecting one or combining a plurality of signals from their corresponding signal paths,
   wherein each signal path includes:
      filtering means for filtering said received signal; and
      amplifier means for amplifying said filtered signal and generating an amplified signal;
   and wherein the control means is connected to each of said amplifier means, alternatively selects one or combines a plurality of said amplified signals from their corresponding signal paths to increase sensitivity to desired information in said radio frequency signal, and tests a plurality of selective combinations of said signal paths, each combination having a different gain for one or more of said amplifier means, and determines said signal quality of said output signal based on a measured signal strength of said output signal corresponding to each combination.

7. A radio receiving apparatus for receiving a radio frequency signal and generating a desired output signal, comprising:
   plural signal paths for receiving a radio frequency signal, each signal path including: filtering means for filtering said received signal; and amplifier means for amplifying said filtered signal and generating an amplified signal;
   combining means, connected to said amplifier means, for combining amplified signals from each of said signal paths;
   processing means, connected to said combining means, for processing said combined amplified signals and generating a processed signal; and
   control means, connected to said processing means, for detecting a characteristic of said processed signal and for generating control signals for adaptively weighting each of said amplified signals in said combining means to cause said processed signal to become said desired signal, said control signals being generated before reception of a segment of said desired signal and being thereafter fixed for the duration of said segment.

8. The radio receiving apparatus as claimed in claim 7, wherein said control signals are bias voltages applied to each of said amplifier means to vary the magnitude of said amplified signals.

9. The radio receiving apparatus as claimed in claim 8, wherein said bias voltage controls the amplifier gain.

10. The radio receiving apparatus as claimed in claim 7, wherein said control means sequentially tests combinations of receiving paths by systematically modifying the number of receiving paths and the weighting applied to each of said amplified signals.

11. The radio receiving apparatus as claimed in claim 7, further comprising:
   phase inverting means, connected to the output of at least one of said amplifier means, for inverting the phase of at least one amplified signal to constructively combine amplified signals from each of said signal paths.

12. The radio receiving apparatus as claimed in claim 11, wherein said phase inverting means includes plural alternative phase shifts and said control means sequentially selects each one of said plural alternative phase shifts to determine a combination of signal paths that results in said processed signal of highest signal quality.

13. The radio receiving apparatus as claimed in claim 7, wherein said control means sequentially selects a variety of signal path combinations and measures the signal quality of said processed signal under each of said signal path combinations to determine an optimal combination.

14. The radio receiving apparatus as claimed in claim 13, wherein said control means statistically determines said processed signal having the highest probability of high signal quality.

15. The radio receiving apparatus as claimed in claim 13, wherein said received signal is time division multiplexed with other information and said control means determines said optimal combination during time periods when said other information is being received by other receivers.

16. The radio receiving apparatus as claimed in claim 13, wherein said signal quality is determined as a function of bit error rate of said processed signal.

17. A radio receiving apparatus for receiving a time division multiplexed (TDM) radio frequency signal having a repetitive TDM frame period divided into at least one intended time slot that is intended to be received by said radio receiving apparatus, and at least one other time slot for reception by another receiver, comprising:
   plural signal paths for receiving said TDM radio frequency signal;
   selection means, coupled to said plural signal paths and controlled by control signals for producing a selected signal from a path selection, said path selection alternatively being a single signal path selected from said plural signal paths or a weighted combination of signal paths selected from said plural signal paths;
   demodulation means for generating, from said selected signal, a demodulated signal and a signal quality measure; and
   control means, connected to said demodulation means and said selection means, for generating control signals for sequentially selecting a different single signal path selected from said plural signal paths and a different weighted combination of signal paths selected from said plural signal paths, and for determining a preferred path selection that produces a best selected signal having a best signal quality measure during at least one of said at least one other time slot for reception by another receiver, said preferred path selection then being used for demodulation of said TDM radio frequency signal during a succeeding intended time slot.

18. The radio receiving apparatus as claimed in claim 17, wherein said control means sequentially tests combinations of signal paths by systematically modifying the number of signal paths and the weighting applied to each of said signal paths.

19. The radio receiving apparatus as claimed in claim 17, wherein each of said plural signal paths includes amplifier means for amplifying said filtered signal and generating an amplified signal, and wherein the radio receiving apparatus further comprises phase inverting means, connected to the output of at least one of said amplifier means, for inverting the phase of at least one amplified signal to constructively combine amplified signals from each of said signal paths.

20. The radio receiving apparatus as claimed in claim 19, wherein said phase inverting means includes plural alternative phase shifts and said control means sequentially selects each one of said plural alternative phase shifts to determine a combination of signal paths that results in said selected signal of highest signal quality.

21. The radio receiving apparatus as claimed in claim 19, wherein said control means sequentially selects a variety of signal path combinations and measures the signal quality of said selected signal under each of said signal path combinations to determine an optimal combination.

22. The radio receiving apparatus as claimed in claim 21, wherein said control means statistically determines said selected signal having the highest probability of high signal quality.

23. The radio receiving apparatus as claimed in claim 21, wherein said signal quality is determined as a function of bit error rate of said selected signal.

24. The radio receiving apparatus as claimed in claim 17, wherein said weighted combination is alternatively a sum and a difference combination.

25. The radio receiving apparatus as claimed in claim 24, wherein said selection means selects only between said sum and said difference combination.

* * * * *